United States Patent Office 3,391,974
Patented July 9, 1968

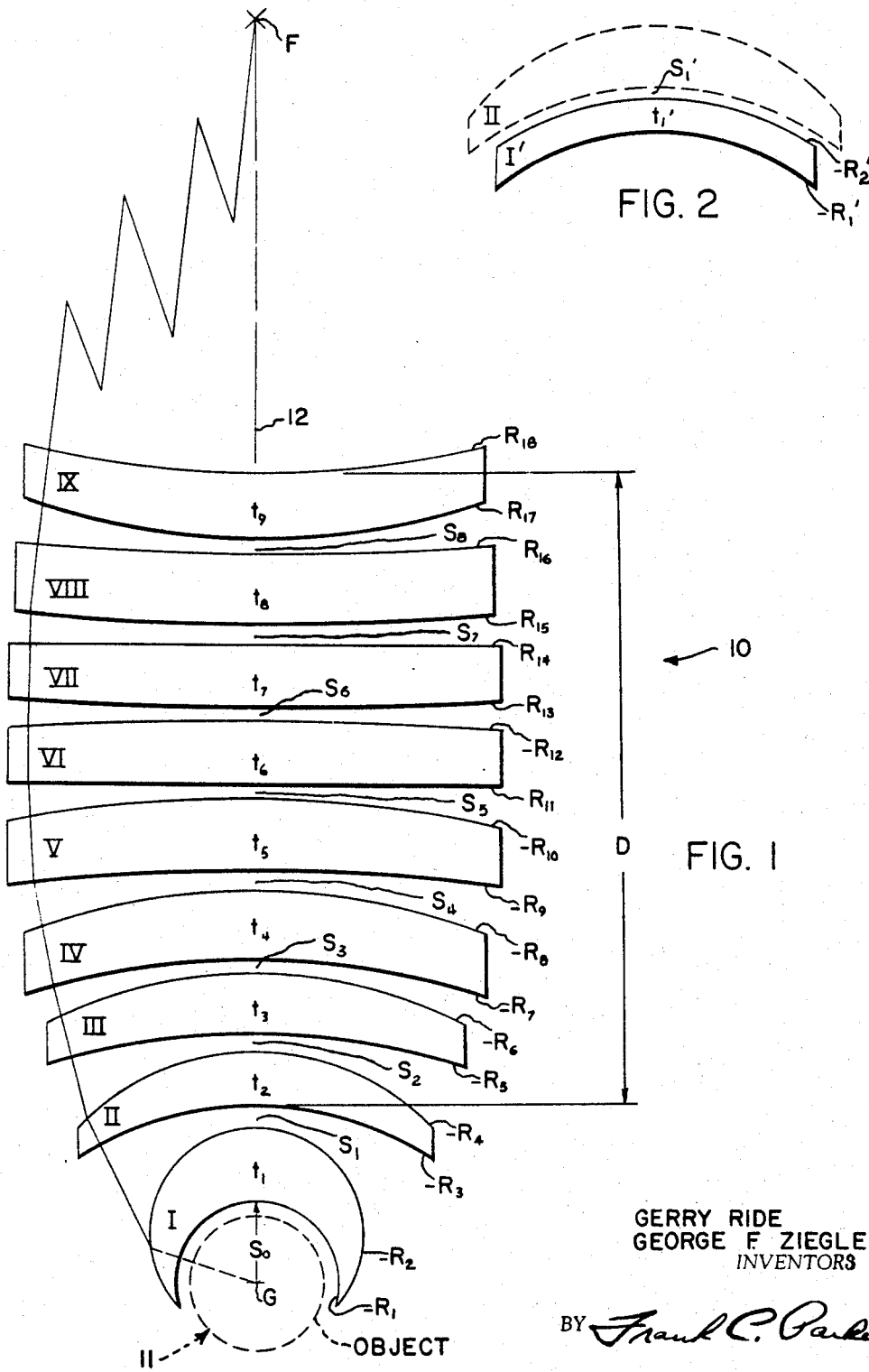

3,391,974
PROGRESSIVELY POWERED SINGLETS FOR APLANATIC OPTICAL OBJECTIVE FOR SPHERICAL INTERFEROMETERS
Gerry Ride and George F. Ziegler, Gates, N.Y., assignors to Bausch & Lomb Incorporated, Rochester, N.Y., a corporation of New York
Filed Jan. 15, 1965, Ser. No. 425,767
2 Claims. (Cl. 350—214)

ABSTRACT OF THE DISCLOSURE

An aplanatic optical objective for a spherical interferometer composed of collective singlet lenses having gradually decreasing collective powers through a low power and these lenses being followed by gradually increasing collective powers toward the image side of the objective, the lens curvatures being so constructed as to avoid destructive retro-reflections between successive lenses.

---

The present invention relates to an optical objective for use in spherical interferometers and more particularly relates to improvements in such objectives.

Although the development of spherical interferometers has been accelerated in recent times, as evidenced by Patent No. 3,028,782 issued to E. Bernhardt et al. on Apr. 10, 1962, the ultraprecise requirements of the most modern interferometric inspection apparatus necessitates the use of a highly coherent monochromatic light source such as a laser radiation, the term "laser" referring to light amplification by stimulated emission of radiation. When using such a light source in an interferometer, new and more critical problems of lens design are presented in designing the objective. In view of this fact it is an object of the present invention to provide an optical objective for a sperical interferometer using laser light of a wave length of substantially 6328 A., said objective being especially well corrected for spherical aberration and coma.

It is a further object to provide such an objective which is so constructed as to avoid destructive retroreflection of light which is incident upon the successive lens surfaces in the objective so that the fringe pattern produced by the interferometer is strong and well defined.

Further objects and advantages will be found in the combination and arrangement and in the details of construction of the constituent parts of said objective by reference to the following specification and accompanying drawings, wherein:

FIG. 1 is an optical diagram showing a preferred form of optical objective in association with an object to be measured; and FIG. 2 is an optical diagram showing an alternate design for the front lens of said objective.

With reference to FIG. 1 of the drawing, there is provided an optical objective which is generally designated by the numeral 10, said objective being shown in association with a spherical object such as a ball 11 located in measuring position with reference to said objective as shown by dashed lines. As there shown, the objective 10 is comprised of a series or sequence of singlet lenses which are designated I to IX, all being aligned on an optical axis 12 and having positive power.

In foremost position adjacent to the ball 11 is provided a meniscus aplanatic lens designated I having a concave spherical surface of radius $-R_1$, the minus $(-)$ sign designating a lens surface which is concave toward the short conjugate of the lens system. The angular aperture that the surface $-R_1$ subtends at the point G is at least 140°. The optical system is so constructed that, within a certain tolerance, all rays issuing from the point F and entering the lens system at surface $R_{18}$ emerge perpendicular to the surface $-R_1$ and converge to a focus at the axial point G, at a distance $S_0$ from the vertex of the surface $-R_1$. If the object to be tested is a sphere of radius smaller than $-R_1$, it is positioned in the apparatus so that its center of curvature falls at the point G. By this means the surface of the object to be tested is approximately perpendicular to all rays issuing from surface $-R_1$; interference occurs between the reference surface $-R_1$ and the surface of the object to be tested; and the fringe pattern may be observed at the point F. The rear spherical surface of lens I farthest from the object has a radius designated $-R_2$. This construction requires carefully computed constructional data including the values of $-R_1$, $-R_2$ and the axial thickness $t_1$ as set forth hereinafter in order to achieve true aplanatism of lens I.

Spaced rearwardly of front lens I is a series of four meniscus lenses designated II, III, IV and V which are air spaced from each other by successive air spaces which are designated respectively $S_1$, $S_2$, $S_3$ and $S_4$ and have axial thicknesses designated respectively $t_2$, $t_3$, $t_4$ and $t_5$. One outstanding characteristic of this series of lenses II to V is that each successive lens is provided with lesser converging power than the previous lens numbering toward the long conjugate progressively and all have less power than lens I.

Another property found in said series of lenses II to V is the correction of all of these lenses to a quasi-aplanatic condition for monochromatic light of $\lambda = 6328$ A., the departure from true aplanatism thereof being only that amount required to prevent retroreflection of rays which are incident on the lens surfaces since retroreflected rays tend to degrade the fringe pattern produced by the interferometer. It should be understood, however, that the amount of departure from the true aplanatic condition in any case is very small in order to achieve substantially full strength or visibility of the interferometric fringe system.

Air spaced rearwardly from lens V is a pair of planoconvex lenses identified by designation VI and VII, the convex surfaces thereof being adjacent to each other. Lenses VI and VII are not aplanatic in performance but are so constructed as to form a symmetrical relay system which transmits the image rays without distortion to the rear section of said objective.

Said rear section comprises in one successful form of the invention a pair of meniscus lenses designated VIII and IX which are spaced from each other and from lens VII, each lens having a concave surface which faces rearwardly. Lenses VIII and IX may be described as being quasi-aplanatic to the same degree as the previously described group of lenses II to V and for the same purpose.

The distinctive property of the rear or long conjugate group of lenses VIII and IX is the increase of converging powers of the individual lenses toward the rear whereby the image rays are converged to an axial focal point F located rearwardly of the objective at a distance between 2.3D and 2.8D, the distance ideally being substantially 2.574D where D represents the axial length of the objective through lenses II to IX.

For the purpose of correcting the objective 10 in such a precise manner as to enable the aforesaid spherical interferometer to form a fringe system with an error of less than $\lambda/25$ where $\lambda$ represents the wave length light of 6328 A., the constructional data thereof is specified herebelow.

The equivalent focal lengths of the successive lenses I to IX as constituted in the above description are given in the table of mathematical statements herebelow, the values thereof being stated in terms of D which is previouly defined, said focal lengths being designated respectively $F_1$ to $F_9$, $$.930D < F_1 < 1.130D$$
$$1.190D < F_2 < 1.454D$$
$$3.031D < F_3 < 3.705D$$
$$3.594D < F_4 < 4.380D$$
$$8.208D < F_5 < 10.032D$$
$$8.802D < F_6 < 10.758D$$
$$8.802D < F_7 < 10.758D$$
$$9.270D < F_8 < 11.330D$$
$$5.400D < F_9 < 6.600D$$

Alternately to the use of lens I, other lenses may be used to measure spherical object surfaces having considerably larger radius. Such a lens in this application is shown in FIG. 2 of the drawing and is designated I' the front surface $-R_1'$ and rear surface $-R_2'$ thereof being concentric with the spherical surface of said object 11 during all interferometric measurements. The axial thickness of lens I' is designated $t_1'$, the space between lens I' and lens II is designated $S_1'$, and its equivalent focal length $-F_1'$ has a value between 6.68D and 8.16D. The value for $t_1'$ should lie between .0480D and .0586D while the value for $S_1'$ should lie between .0206D and .0252D.

The axial thicknesses of the successive lenses I to IX are designated respectively $t_1$ to $t_9$ and the successive interlens air spaces are designated $S_1$ to $S_8$, the values for these dimensions being given in the table of mathematical expressions herebelow, $$.1030D < t_1 < .1258D$$
$$.0825D < t_2 < .1007D$$
$$.0825D < t_3 < .1007D$$
$$.1030D < t_4 < .1258D$$
$$.1030D < t_5 < .1258D$$
$$.0894D < t_6 < .1092D$$
$$.0894D < t_7 < .1092D$$
$$.1030D < t_8 < .1258D$$
$$.1030D < t_9 < .1258D$$
$$.0220D < S_1 < .0390D$$
$$.0206D < S_2 < .0252D$$
$$.0206D < S_3 < .0252D$$
$$.0206D < S_4 < .0252D$$
$$.0206D < S_5 < .0252D$$
$$.0206D < S_6 < .0252D$$
$$.0206D < S_7 < .0252D$$
$$.0206D < S_8 < .0252D$$

Ideally, the specific values of the focal lengths $F_1$ to $F_9$ and $-F_1'$, the values of the lens thicknesses $t_1$ to $t_9$ and $t_1'$, and the values for the air spaces $S_1$ to $S_8$ and $S_1'$, are substantially as given in the table herebelow,

| | | |
|---|---|---|
| $F_1 = 1.030D$ | $t_1 = .1144D$ | $S_1 = .0381D$ |
| $F_2 = 1.322D$ | $t_2 = .0916D$ | $S_2 = .0229D$ |
| $F_3 = 3.368D$ | $t_3 = .0916D$ | $S_3 = .0229D$ |
| $F_4 = 3.982D$ | $t_4 = .1144D$ | $S_4 = .0229D$ |
| $F_5 = 9.120D$ | $t_5 = .1144D$ | $S_5 = .0229D$ |
| $F_6 = 9.780D$ | $t_6 = .0993D$ | $S_6 = .0229D$ |
| $F_7 = 9.780D$ | $t_7 = .0993D$ | $S_7 = .0229D$ |
| $F_8 = 10.300D$ | $t_8 = .1144D$ | $S_8 = .0229D$ |
| $F_9 = 6.000D$ | $t_9 = .1144D$ | $S_1' = .0229D$ |
| $-F_1' = 7.450D$ | $t_1' = .0533D$ | |

In further fulfillment of the objects of this invention, the radii of the successive lens surfaces of lenses I to IX which are designated successively $-R_1$, $-R_2$, $-R_3$, $-R_4$, $-R_5$, $-R_6$, $-R_7$, $-R_8$, $-R_9$, $-R_{10}$, $R_{11}$, $-R_{12}$, $R_{13}$, $R_{14}$, $R_{15}$, $R_{16}$, $R_{17}$ and $R_{18}$, have values as given in terms of the quantity D in the mathematical statements in the table herebelow wherein the minus ($-$) sign signifies that the surface is concave toward the front or object side, $$.109D < -R_1 < .133D$$
$$.138D < -R_2 < .168D$$
$$.450D < -R_3 < .550D$$
$$.343D < -R_4 < .419D$$
$$.850D < -R_5 < 1.038D$$
$$.669D < -R_6 < .817D$$
$$1.682D < -R_7 < 2.054D$$
$$1.120D < -R_8 < 1.369D$$
$$5.470D < -R_9 < 6.670D$$
$$3.120D < -R_{10} < 3.800D$$
$$R_{11} > \pm 2.0D$$
$$7.600D < -R_{12} < 9.280D$$
$$7.600D < -R_{13} < 9.280D$$
$$R_{14} > \pm 2.0D$$
$$3.330D < -R_{15} < 4.050D$$
$$5.600D < R_{16} < 6.840D$$
$$1.769D < R_{17} < 2.161D$$
$$2.774D < R_{18} < 3.390D$$

For the alternative front lens I' the corresponding values for the radii $-R_1'$ and $-R_2'$ of the front and rear lens surfaces respectively are $$.362D < -R_1' < .442D$$
$$.409D < -R_2' < .499D$$

Ideally, the specific values of the radii $-R_1$ to $R_{18}$ and the alternative lens surfaces $-R_1'$ and $-R_2'$ are substantially as given in the consolidated table herebelow,

| | |
|---|---|
| $-R_1 = .1212D$ | $R_{11} = \text{PLANO}$ |
| $-R_2 = .1530D$ | $-R_{12} = 8.4400D$ |
| $-R_3 = .5000D$ | $R_{13} = 8.4400D$ |
| $-R_4 = .3810D$ | $R_{14} = \text{PLANO}$ |
| $-R_5 = .9440D$ | $R_{15} = 3.6900D$ |
| $-R_6 = .7430D$ | $R_{16} = 6.2200D$ |
| $-R_7 = 1.868D$ | $R_{17} = 1.9650D$ |
| $-R_8 = 1.244D$ | $R_{18} = 3.0820D$ |
| $-R_9 = 6.0700D$ | $-R_1' = .4020D$ |
| $-R_{10} = 3.4600D$ | $-R_2' = .4540D$ |

Furthermore, when using the specified laser light $$\lambda = 6328$$

A, the glass used in all of the lenses in the objective 10 ideally is intended to have a refractive index of 1.864253, the Abbe number of the glass not being critical because of the pure monochromaticity of the laser light.

From the above description it will be perceived that the principal objects and advantages of the present invention are achieved by providing as near as possible a fully aplanatic objective in which spherical aberration and coma are nearly perfectly corrected, the departure from true aplanatic condition in any lens of said objective being only sufficient to prevent retroreflection of rays from the respective lens surfaces. As aforesaid, an exceedingly excellent performance is achieved by the specified construction wherein the fringe pattern produced by said spherical interferometer is accurate to at least $\frac{1}{25}\lambda$ of laser light.

Although only certain embodiments of the present invention have been shown and described in detail, other forms are possible and changes may be made in the constructional details thereof within the specified limits without departing from the spirit of the invention as defined in the claims here appended.

We claim:
1. An optical objective for a spherical interferometer which operates with highly coherent monochromatic light, said objective having a numerical aperture on its short conjugate side as large as 0.95 and comprising:

a front aplanatic meniscus lens designated I having a front spherical surface which is located concentrically with and facing a substantially spherical object to be measured, said surface having an angular extent of at least 140°, a pair of like plano-convex lenses which are designated VI and VII, the convex surfaces thereof being turned toward each other, a series of four quasi-aplanatic meniscus lenses which are successively designated II, III, IV and V and are located in optical alignment between lens I and lens VI, said lenses being concave toward lens I, said meniscus lenses having progressively lesser individual powers toward the rear and long conjugate side of the objective, and a pair of quasi-aplanatic meniscus lenses designated VIII and IX located rearwardly of lens VII in optical alignment therewith, said lenses being concave toward the rear and having progressively more individual power toward the rear than lens VII, the deficiency in true aplanatic condition of said quasi-aplanatic lenses being sufficient only to avoid retro-reflection at any front surface of a lens, the value for the constructional data for said objective being given substantially in the table of mathematical expressions herebelow wherein $-R_1$ to $R_{18}$ respectively represent the radii of the successive lens surfaces of lenses I to IX, the minus ($-$) sign used therewith denoting lens surfaces which are concave toward the short conjugate side of the objective, $t_1$ to $t_9$ represent the axial thicknesses of lenses I to IX, and $S_1$ to $S_8$ represent the successive interlens air spaces, and D represents the axial distance through lenses II to IX inclusive,

| | |
|---|---|
| $-R_1=.1212D$ | $R_{14}=\text{PLANO}$ |
| $-R_2=.153D$ | $R_{15}=3.690D$ |
| $-R_3=.500D$ | $R_{16}=6.220D$ |
| $-R_4=.381D$ | $R_{17}=1.965D$ |
| $-R_5=.944D$ | $R_{18}=3.082D$ |
| $-R_6=.743D$ | $t_1=.1144D$ |
| $-R_7=1.868D$ | $t_2=.0916D$ |
| $-R_8=1.244D$ | $t_3=.0916D$ |
| $-R_9=6.070D$ | $t_4=.1144D$ |
| $-R_{10}=3.460D$ | $t_5=.1144D$ |
| $R_{11}=\text{PLANO}$ | $t_6=.0993D$ |
| $-R_{12}=8.440D$ | $t_7=.0993D$ |
| $R_{13}=8.440D$ | $t_8=.1144D$ |
| | $t_9=.1144D$ |

$$S_1=.0381D$$
$$S_2=S_3=S_4=S_5=S_6=S_7=S_8=.0229D$$

the image formed by the objective being located at an axial point which lies on the long conjugate side of lens IX at a distance of substantially 2.25D, the optical materials from which all of the lenses are formed having a refractive index of 1.864253 when said monochromatic light has a wave length of 6328 A. substantially.

2. An optical objective for a spherical interferometer which operates on monochromatic laser light, said objective having a numerical aperture on its short conjugate side as large as .51 and comprising:

a front aplanatic meniscus lens designated I' having a front spherical surface which is located concentrically with and facing a substantially spherical object to be measured, said surface having an angular extent of at least 65°, a pair of like plano-convex lenses which are designated VI and VII, the convex surfaces thereof being turned toward each other, a series of four quasi-aplanatic meniscus lenses which are successively designated II, III, IV and V and are located in optical alignment between lens I and lens VI, said lenses being concave toward lens I, said meniscus lenses having progressively lesser individual powers toward the rear and long conjugate side of the objective, and a pair of quasi-aplanatic meniscus lenses designated VIII and IX located rearwardly of lens VII in optical alignment therewith, said lenses being concave toward the rear and having progressively more individual power toward the rear than lens VII, the deficiency in true aplanatic condition of said quasi-aplanatic lenses being sufficiently only to avoid retroreflection at any front surface of a lens, the values for the constructional data for said objective being given substantially in the table of mathematical expression herebelow wherein $-R_1'$ to $R_{18}$ represent the radii of the successive lens surfaces of lenses I to IX, the minus ($-$) sign used therewith denoting lens surfaces which are concave toward the front, $t_1'$ to $t_9$ represent the axial thickness of lenses I to IX, and $S_1'$ to $S_8$ represent the successive interlens air spaces, and D represents the axial distance through lenses II to IX inclusive,

| | |
|---|---|
| $-R_1'=.402D$ | $-R_{12}=8.440D$ |
| $-R_2'=.454D$ | $R_{13}=8.440D$ |
| $-R_3=.500D$ | $R_{14}=\text{PLANO}$ |
| $-R_4=.381D$ | $R_{15}=3.690D$ |
| $-R_5=.944D$ | $R_{16}=6.220D$ |
| $-R_6=.743D$ | $R_{17}=1.965D$ |
| $-R_7=1.868D$ | $R_{18}=3.082D$ |
| $-R_8=1.244D$ | $t_1'=.533D$ |
| $-R_9=6.070D$ | $t_2=t_3=.0916D$ |
| $-R_{10}=3.460D$ | $t_4=t_5=t_8=t_9=.1144D$ |
| $R_{11}=\text{PLANO}$ | $t_6=t_7=.0993D$ |

$$S_1'=S_2=S_3=S_4=S_5=S_6=S_7=S_8=.0229D$$

the image formed by said objective being located at an axial point which lies rearwardly of lens IX at a distance of substantially 2.25D, the optical materials from which all of the lenses are formed having a refractive index of 1.864253 when said monochromatic light has a wave length of 6328 A. substantially.

References Cited

UNITED STATES PATENTS 3,028,782   4—1962   Bernhardt et al. _____ 88—14

DAVID H. RUBIN, *Primary Examiner.*

R. I STERN, *Assistant Examiner.*

UNITED STATES PATENT OFFICE
CERTIFICATE OF CORRECTION

Patent No. 3,391,974                                     July 9, 1968

Gerry Ride et al.

It is certified that error appears in the above identified patent and that said Letters Patent are hereby corrected as shown below:

Column 4, line 5, "$-R_8 < 1.369D$" should read -- $-R_8 < 1.368D$ --; line 10, "$-R_{13}$" should read -- $R_{13}$ --; line 12, "$-R_{15}$" should read -- $R_{15}$ --; line 37, "$\lambda = 6328$" should read -- $\lambda = 6328A$, --; line 39, cancel "A,".

Signed and sealed this 10th day of February 1970.

(SEAL)
Attest:

Edward M. Fletcher, Jr.                        WILLIAM E. SCHUYLER, JR.
Attesting Officer                                    Commissioner of Patents